United States Patent [19]
Walz

[11] 3,986,913
[45] Oct. 19, 1976

[54] METHOD OF REPAIRING A CRACK IN A PANE OF PLATE GLASS

[76] Inventor: Robert A. Walz, 217 Enfield Road, Dayton, Ohio 45459

[22] Filed: Apr. 24, 1975

[21] Appl. No.: 571,070

[52] U.S. Cl. .................................. 156/98; 156/252; 156/293; 156/303.1; 65/28; 428/63; 428/67
[51] Int. Cl.² .................... B32B 3/10; B29C 17/10; B32B 35/00; C03C 27/10
[58] Field of Search ............. 156/94, 98, 293, 252, 156/303.1, 513; 65/28; 428/63, 67

[56] References Cited
UNITED STATES PATENTS

| | | | |
|---|---|---|---|
| 2,143,744 | 1/1939 | Sohn | 428/67 X |
| 3,551,234 | 12/1970 | Britton | 65/28 X |
| 3,765,975 | 10/1973 | Hollingsworth | 156/94 |
| 3,841,932 | 10/1974 | Forler et al. | 156/94 |

*Primary Examiner*—Philip Dier
*Attorney, Agent, or Firm*—Biebel, French & Nauman

[57] ABSTRACT

The invention provides for repairing a crack in a pane of plate glass caused by the impact of a hard object without removing the glass from its location by cutting out a section from the glass surrounding the crack and replacing it with a disc of a similar sheet of glass.

7 Claims, 12 Drawing Figures

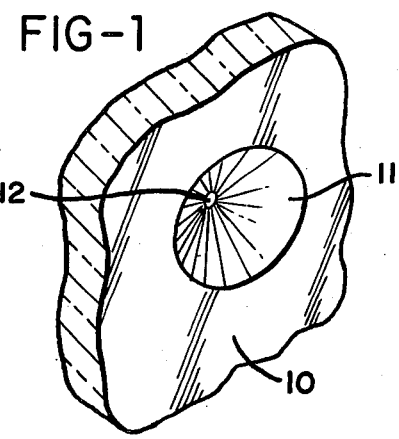
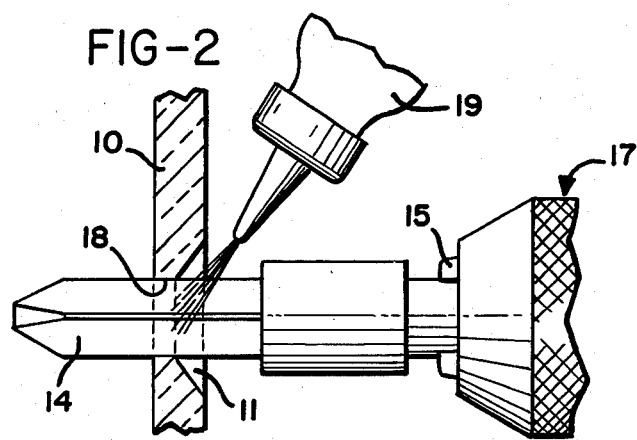
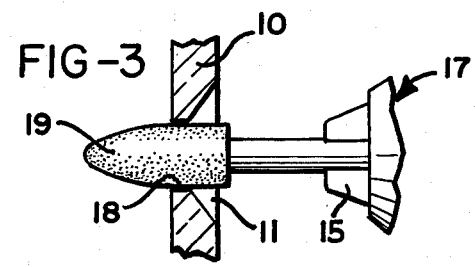
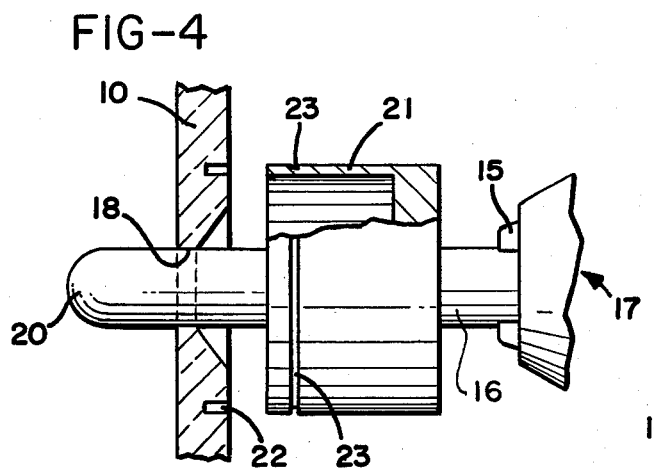
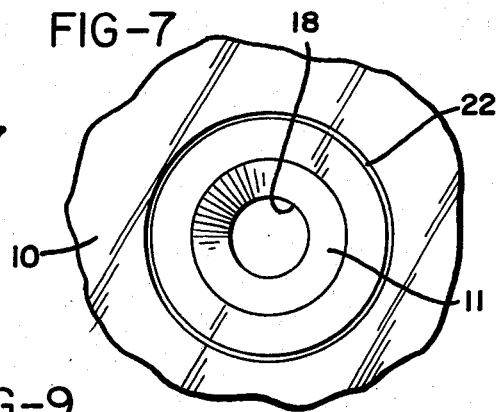
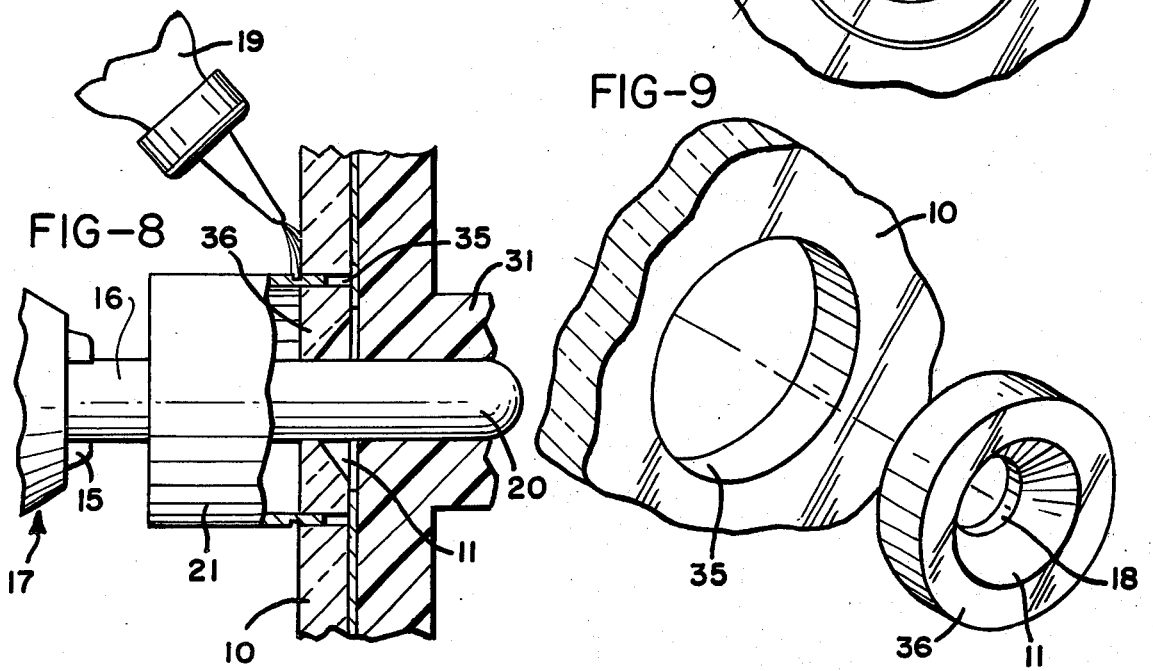

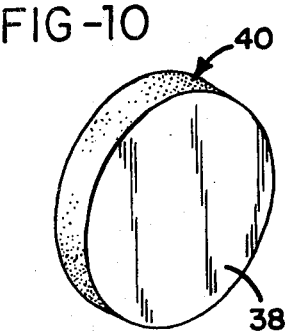
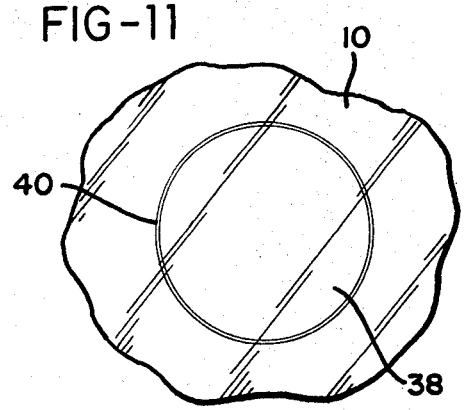
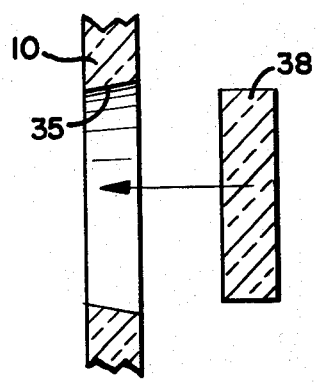
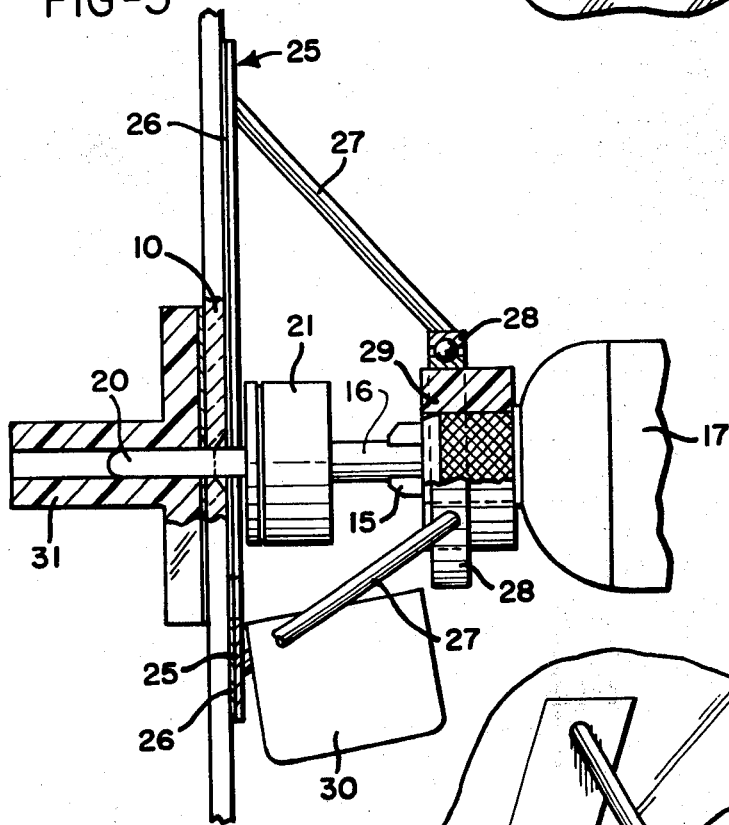
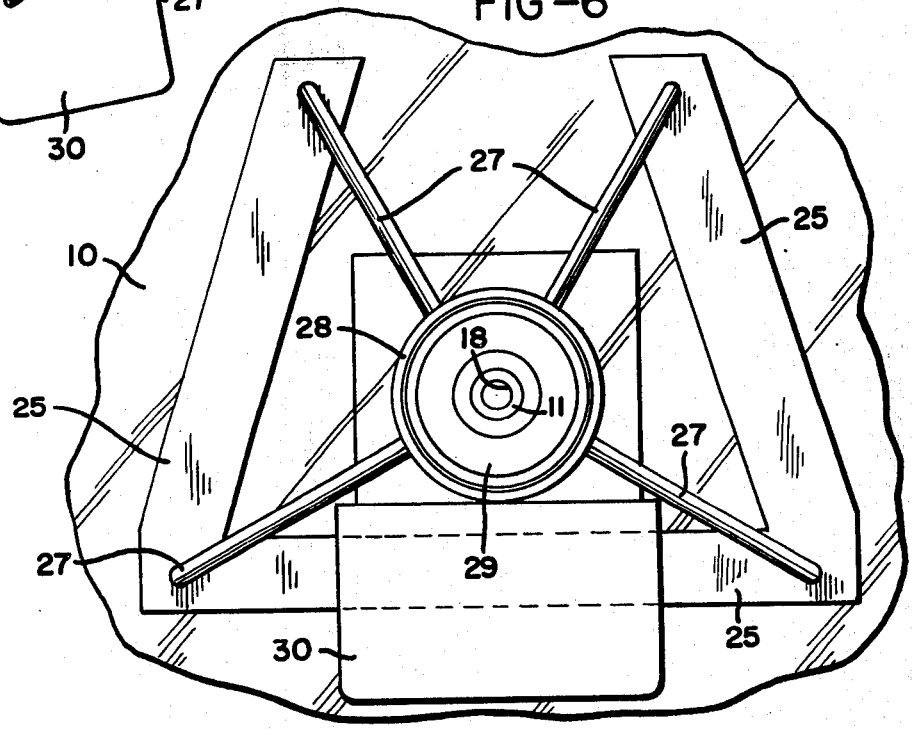

1

METHOD OF REPAIRING A CRACK IN A PANE OF PLATE GLASS

BACKGROUND OF THE INVENTION

It has been proposed to repair safety glass such as that used on the windshield of an automobile where only the outer sheet of glass has been cracked by filling the space surrounding the cracked section with a settable plastic resin such that the crack is no longer visible.

SUMMARY OF THE INVENTION

The invention involves cutting through the pane of glass in the area of the crack, making a cut, circular or other shape, larger in diameter than the crack from the two opposite sides so that there is no break-through of a cutting tool at either surface of the pane, forming a matching disc from another piece of scrap glass, and securing the disc in place in the aperture by means of a curable adhesive or cement.

BRIEF DESCRIPTION OF THE DRAWINGS

FIG. 1 is a view from the inside of a pane of plate glass showing a typical crack in the glass indicating that it is relatively large and generally cone-shaped on the inside and with a rather small aperture on the outside where the impact occurred;

FIG. 2 is a view showing a drill used to form a relatively small diameter hole through the glass in the area in which the crack exists;

FIG. 3 is a view showing a grinder for forming a smooth inner surface on the hole;

FIG. 4 is a view showing the principle of using a cylindrical cutter with a pilot extending into the hole previously formed and the formation of a circular groove part way through the thickness of the glass;

FIGS. 5 and 6 are side and elevational views of a fitting for supporting the cutter while the glass is being cut;

FIG. 7 is a plan view after the initial cutting operation shown in FIG. 4;

FIG. 8 is a view showing a cutting operation similar in principle to that in FIG. 4 but performed on the opposite face of the glass, the cut being guided by the pilot so that it will match up with the first cut made as shown in FIGS. 4, 5 and 6;

FIG. 9 shows that the cylindrical section is then removed leaving a cylindrical aperture in the glass;

FIG. 10 is a view showing the repair disc;

FIG. 11 is a view showing the repaired plate glass with the disc in position and held therein by a curable plastic adhesive or cement; and FIG. 12 is a view showing a modification in which the aperture in the plate glass is provided with a slight taper so that the repair disc will be received in proper position when fitted into place.

DESCRIPTION OF THE PREFERRED EMBODIMENT

Referring to FIG. 1, 10 illustrates a pane of plate glass such as that used in store front windows and the like. When such a pane of glass is struck by a hard object such as a stone, a BB shot or the like, a conical crack 11 is formed on the side where the impact occurred, such crack usually being cone-shaped and tapering from a small opening 12 on the impact or outside of the glass. If the glass cannot be repaired it would have to be replaced in its entirety and this would involve substantial expense. Even the removal of the glass from its position for repair would require special handling and would likewise involve substantial expense.

FIG. 2 shows the first step in the repair which can take place with the glass remaining in its position of use. For this purpose a tungsten carbide prismatic glass drill 14, mounted in a chuck 15 and operated by power drill 17 is used. Centering on the small hole 12, the drill 14 is used to form a cylindrical opening 18 in the glass, the purpose being to form a guide hole to guide the later cutting operation. The drill 14 is cooled by application of a water coolant or a slurry of abrasive particles in water dispensed from a small squeeze bottle 19. Ordinarily this should be a continuing operation beginning as soon as a white powdery substance or smoke appears.

FIG. 3 shows a cylindrical grinder 19 which is used to obtain smooth wall on opening 18. Thereafter a pilot 20 is inserted in the hole so formed and a cylindrical cutter 21 is applied to form a cylindrical cut 22 extending part way through the thickness of the glass. Typical dimensions are about three-eighths inch diameter for the small hole 18 and about one and one-quarter inches in diameter for the circular cut 22. Again, the cutting operation may be cooled through the application of a water coolant or slurry. It is also found convenient to provide a marking ring 23 on the side of the cutter 21 to indicate the appropriate depth that should be made for the cut 22. With a typical plate glass of one-quarter inch thickness the ring 23 should be located about five thirty-seconds of an inch from the end of the cutter.

It is desirable that the cutter be supported firmly without chatter and in a direction normal to the plane of the glass. Referring to FIGS. 5 and 6, on the side on which the cutting is done a frame 25 is mounted on the glass by means of strips of double sided adhesive tape 26. The frame has arms 27 which support a roller bearing 28 of a diameter to receive and support the stem 16 through use of plastic collar 29, the stem 16 carrying the cutter 21. A container 30 is located in the lower part of the frame to collect any excess water or slurry. On the opposite side of the pane of glass there is a guide tube 31 secured thereto by adhesive, the tube having a bore of a size to receive and guide pilot 20, thus assuring that cutter 21 will be guided to operate without chatter and in a plane normal to the pane of glass.

FIG. 7 is a plan view showing the appearance of the pane of glass at this stage of the processing, the cut 22 extending part way through the glass.

FIG. 8 shows in principle the next operation consisting of using the cutter 21 on the opposite or outside of the plate glass, guided by pilot 20, so that the cut from the back side will match that from the front side. Again, it is desirable to use the guide means of FIGS. 5 and 6. Thus the large aperture so formed is cut by means of cutting operations performed part way through on each side of the glass so that neither operation breaks through the surface which might result in splintering, rough edges or further cracking.

FIG. 9 shows the large aperture 35 so formed and the damaged piece 36 which is removed and discarded.

Instead of the rotary cutter as described an ultrasonic vibrating cutter may be used with or without the use of pilot 20. Preferably the same type of guide means would be employed to maintain the cutter in proper position while cutting in from opposite sides of the glass. With such a cutter there is no need for the cut to be circular, and any desired shape may be used to match in general the shape of the crack.

FIG. 11 shows the disc 38 cut from a piece of scrap glass of the same general type and having a diameter slightly less by a few thousandths of an inch than that of the hole in place in the pane 10 with a liquid settable plastic adhesive or cement 40 in the annular space therebetween, the cement being so chosen that it will be self-curing in a short period of time and with essentially the same index of refraction as the glass itself so that a permanent and practically invisible joint is thus produced. Typical cements which may be used for this purpose are those described in Forler et al. U.S. Pat. No. 3,841,932. An ultra-violet light source may be used to cause the cement to cure faster.

FIG. 12 shows a modification in which the aperture 35 in the pane of glass 10 has a slight taper so that the disc 38, after being coated with the cement material will set in the aperture and form a snug fit in the pane of glass.

While the process and product herein described constitute preferred embodiments of the invention, it is to be understood that the invention is not limited to this precise process and product, and that changes may be made therein without departing from the scope of the invention which is defined in the appended claims.

What is claimed is:

1. The process of repairing a crack in a pane of plate glass which comprises cutting a circular hole through the pane of a diameter sufficient to surround the crack, cutting a cylindrical plug from a similar pane of glass having a diameter slightly less than that of said hole and placing said plug in said hole leaving a small annular clearance space, and filling said clearance space with a curable cement.

2. The process of repairing a crack in a pane of plate glass which comprises cutting a circular hole through the pane of a diameter sufficient to surround the crack including cutting into said pane from opposite sides to avoid splinters and a rough edge resulting from a single cut breaking through the opposite face of the pane, cutting a cylindrical plug from a similar pane of glass having a diameter slightly less than that of said hole and placing said plug in said hole leaving a small annular clearance space, and filling said clearance space with a curable cement.

3. The process of repairing a crack in a pane of plate glass which comprises cutting a circular hole through the pane of a diameter sufficient to surround the crack, cutting a cylindrical plug from a similar pane of glass having a diameter slightly less by a few thousandths of an inch than that of said hole and placing said plug in said hole leaving a small annular clearance space, filling said clearance space with a curable cement, and curing said cement to fix said plug in place in said hole.

4. The method of repairing a crack in a pane of plate glass caused by the impact of a hard object comprising drilling a small diameter hole through the pane on the axis of said crack and normal to said pane, drilling into a first side of the pane part way through the thickness thereof to form a circular cut of a diameter larger than said hole, drilling from the opposite side of the pane to form a circular cut from said opposite side to match and merge into said first larger diameter cut, removing the piece of glass so cut out leaving a circular aperture, forming a cylindrical disc of plate glass from another pane of like characteristics and having an outer diameter slightly less than the diameter of said aperture, and fixing said disc in said aperture by means of a plastic cement which fills the space therebetween to form a permanent bond.

5. The method of repairing a crack in a pane of plate glass caused by the impact of a hard object comprising drilling a small diameter hole through the pane, drilling into a first side of the pane part way through the thickness thereof to form a circular cut of a diameter larger than said hole, drilling from the opposite side of the pane using a pilot for the drill fitting in said small diameter hole to form a circular cut from said opposite side to match and merge into said first larger diameter cut, removing the piece of glass so cut out leaving a circular aperture, forming a cylindrical disc of plate glass from another pane of like characteristics and having an outer diameter slightly less than the diameter of said aperture, and fixing said disc in said aperture by means of a cement which fills the space therebetween to form a permanent bond.

6. The method of claim 4 including the step of forming a small taper on the aperture to allow said disc to fit centrally in said aperture.

7. The method of claim 2 in which the cutting operation is guided to maintain the cut in a predetermined plane and free of chatter.

* * * * *

UNITED STATES PATENT AND TRADEMARK OFFICE
CERTIFICATE OF CORRECTION

PATENT NO. : 3,986,913
DATED : October 19, 1976
INVENTOR(S) : Robert A. Walz

It is certified that error appears in the above-identified patent and that said Letters Patent are hereby corrected as shown below:

On the Title Page, under item (56) References Cited, add:

1,492,402    4/1924    Skinner    428/67

Column 1, line 37, "side and elevational" should be

--side and end elevational--.

Signed and Sealed this

Fourteenth Day of December 1976

[SEAL]

Attest:

RUTH C. MASON
*Attesting Officer*

C. MARSHALL DANN
*Commissioner of Patents and Trademarks*